United States Patent [19]

Wood et al.

[11] 4,024,490
[45] May 17, 1977

[54] MULTIBEAM SIDELOOKING SONAR DISPLAY SYSTEM

[75] Inventors: Kenneth E. Wood, Annapolis; Wesley E. Stevens, Severna Park, both of Md.

[73] Assignee: Westinghouse Electric Corporation, Pittsburgh, Pa.

[22] Filed: Feb. 27, 1976

[21] Appl. No.: 661,922

[52] U.S. Cl. .............................. 340/3 R; 340/3 C; 358/112; 358/140
[51] Int. Cl.² ...................... G01S 9/66; G01S 7/62; H04N 7/18
[58] Field of Search .......... 340/3 R, 3 C, 6 M, 3 T; 178/6.8, DIG. 24

[56] References Cited

UNITED STATES PATENTS

| | | |
|---|---|---|
| 3,792,194 | 2/1974 | Wood et al. .......................... 178/6.8 |
| 3,914,730 | 10/1975 | Jones et al. ......................... 340/3 R |
| 3,925,606 | 12/1975 | Wood et al. ......................... 178/6.8 |

Primary Examiner—Richard A. Farley
Attorney, Agent, or Firm—D. Schron

[57] ABSTRACT

The beam signals of a multibeam sidelooking sonar system are initially time compressed in a first, relatively low speed, logic section and thereafter transferred to a relatively higher speed logic section for placement onto a video disc. The signals from the video disc are presented to a TV display with the information being portrayed as a moving window. The scan conversion operation may be modified to provide a substantially correct picture geometric format as the vehicle carrying the sidelooking sonar apparatus varies its velocity.

9 Claims, 16 Drawing Figures

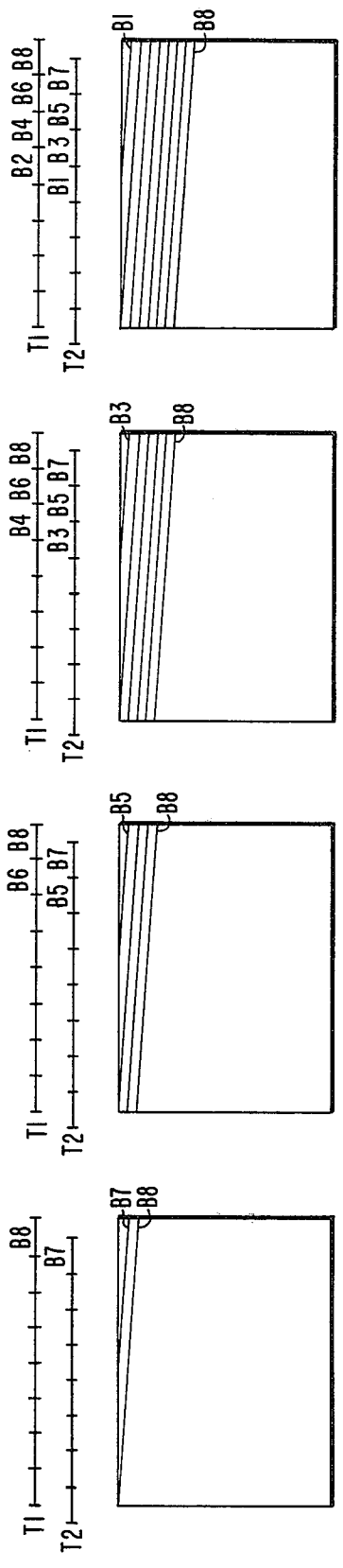
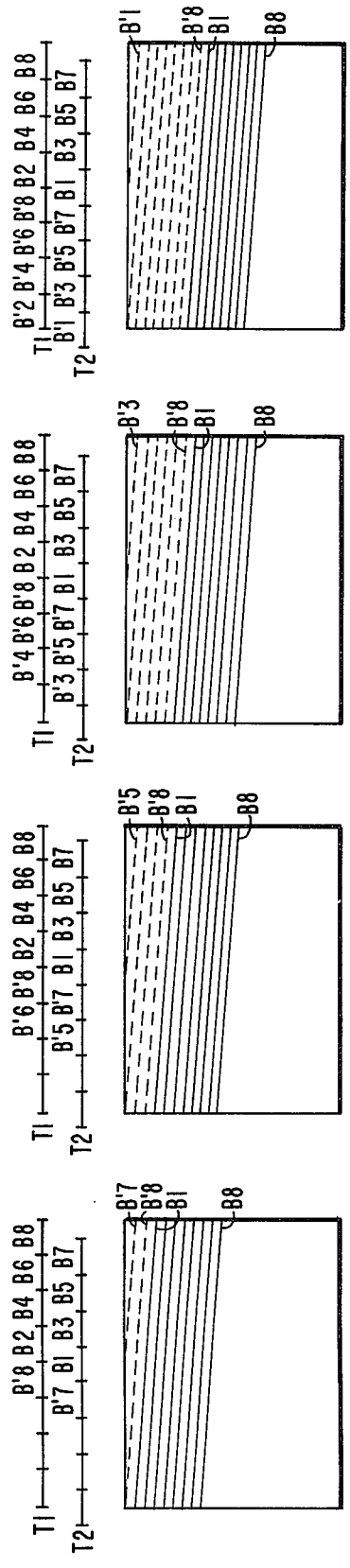

MULTIBEAM SIDELOOKING SONAR DISPLAY SYSTEM

The invention herein-described was made in the course of or under a contract or subcontract thereunder with the Department of the Navy.

BACKGROUND OF THE INVENTION

1. Field of the Invention

The invention in general relates to scan conversion apparatus, and more particularly, to a display system for sidelooking sonar apparatus.

2. Description of the Prior Art

In sidelooking sonar systems the apparatus traveling over a target area repetitivly transmits acoustic pulses to sonify the target area, and energy reflected from narrow adjacent strips on the target area is protrayed as a line-by-line picture that is a pattern of highlights and shadows analogous to an optically viewed panorama illuminated by side lighting, with objects outlined in such a way as to permit their identification. By increasing the area detected and portrayed for each transmitted pulse, the carrier speed and therefore the search or mapping rate, is significantly increased. This is accomplished by the use of multiple receiver beams.

With such multibeam sidelooking sonar systems, it is desirable to view the target area in real time, such as on a conventional TV monitor. This is accomplished by portraying the sidelooking sonar information as a moving window display on the monitor. One such example of a moving window display is described in U.S. Pat. No. 3,792,194, which illustrates, by way of example, a single beam system wherein the beam is rapidly sampled, stored in a shift register and read out therefrom for placement onto a rotating video disc at a rate compatible with the line rate of the TV monitor.

For use with a multibeam system, the necessary high speed logic required for processing the plurality of the beams would significantly add to the cost of the overall system.

A moving window sonar display is also described in U.S. Pat. No. 3,914,730 in conjunction with multiple receive beams; however, such system provides a plurality of channels, one for each beam, and the channels are rapidly scanned so that no intermediate high speed shift register storage is provided.

SUMMARY OF THE INVENTION

The present invention provides a multibeam sidelooking sonar display system which minimizes the amount of hardward required in the high speed logic section, with a consequent minimization of the total hardware costs and heat dissipation.

The system may be designed for a particular number of beams and for a particular carrier velocity, or alternatively, may be designed to accommodate a variable number of beams with different carrier velocities.

In addition to a rotating storage means, such as a video disc, the display system of the present invention includes first and second storage means, each including two storage sections. The beam signals from one transmission are placed into one section of the first storage means while previously stored received beam signals are read out in a sequential manner from the other section. The sequentially read out signals are alternately placed into the first and second sections of the second storage means which are in turn read out at a certain predetermined rate and placed onto the video disc at the proper locations. The read out rate is chosen to be compatible with the line rate of a display, such as a TV monitor. For real time observation, the apparatus is operated as a moving window display.

DESCRIPTION OF THE PREFERRED EMBODIMENTS

Figure 1:
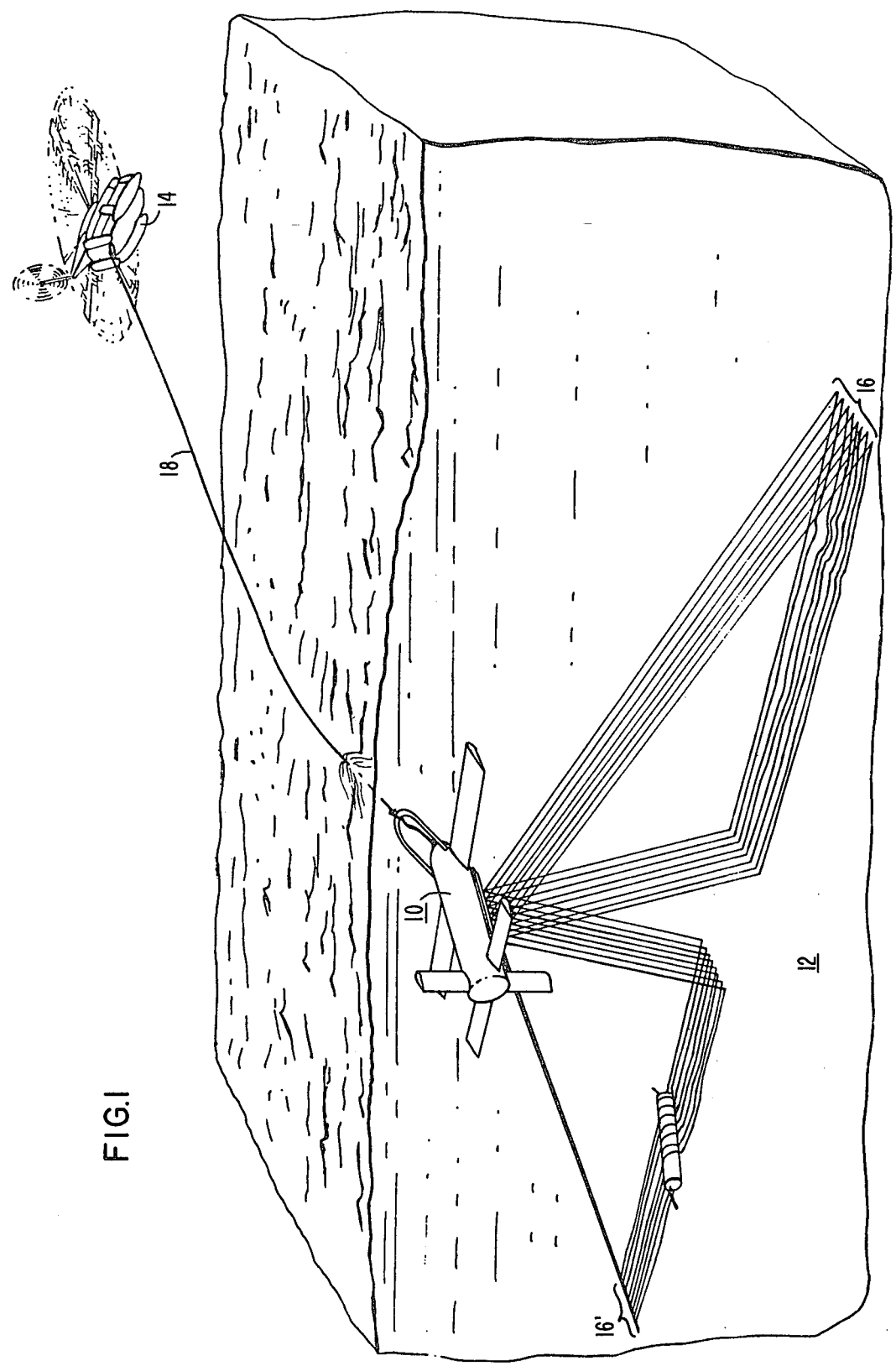
FIG. 1 illustrates a towed carrier multibeam sidelooking sonar system.

In FIG. 1 a multibeam sidelooking sonar system is carried by an underwater carrier vehicle 10 which is towed along a course line over a target area 12 by means of a tow vehicle, such as helicopter 14. In response to each transmission of repetitive acoustic transmissions, a plurality of receive beams are formed for obtaining a sidelooking sonar picture of the target area. For greater coverage, the system will generally employ both starboard beams 16 and port beams 16'.

The receiver beam signals indicative of the target area are transmitted up the cable 18 to display equipment on the towing vehicle 14. With the display taking the form of a conventional cathode ray tube (CRT) TV monitor (one for port and one for starboard signals), each receiver beam signal must be displayed as a separate line on the TV screen and the display must move down the screen as a moving window display as the carrier vehicle 10 travels over the target area 12.

Figure 2:
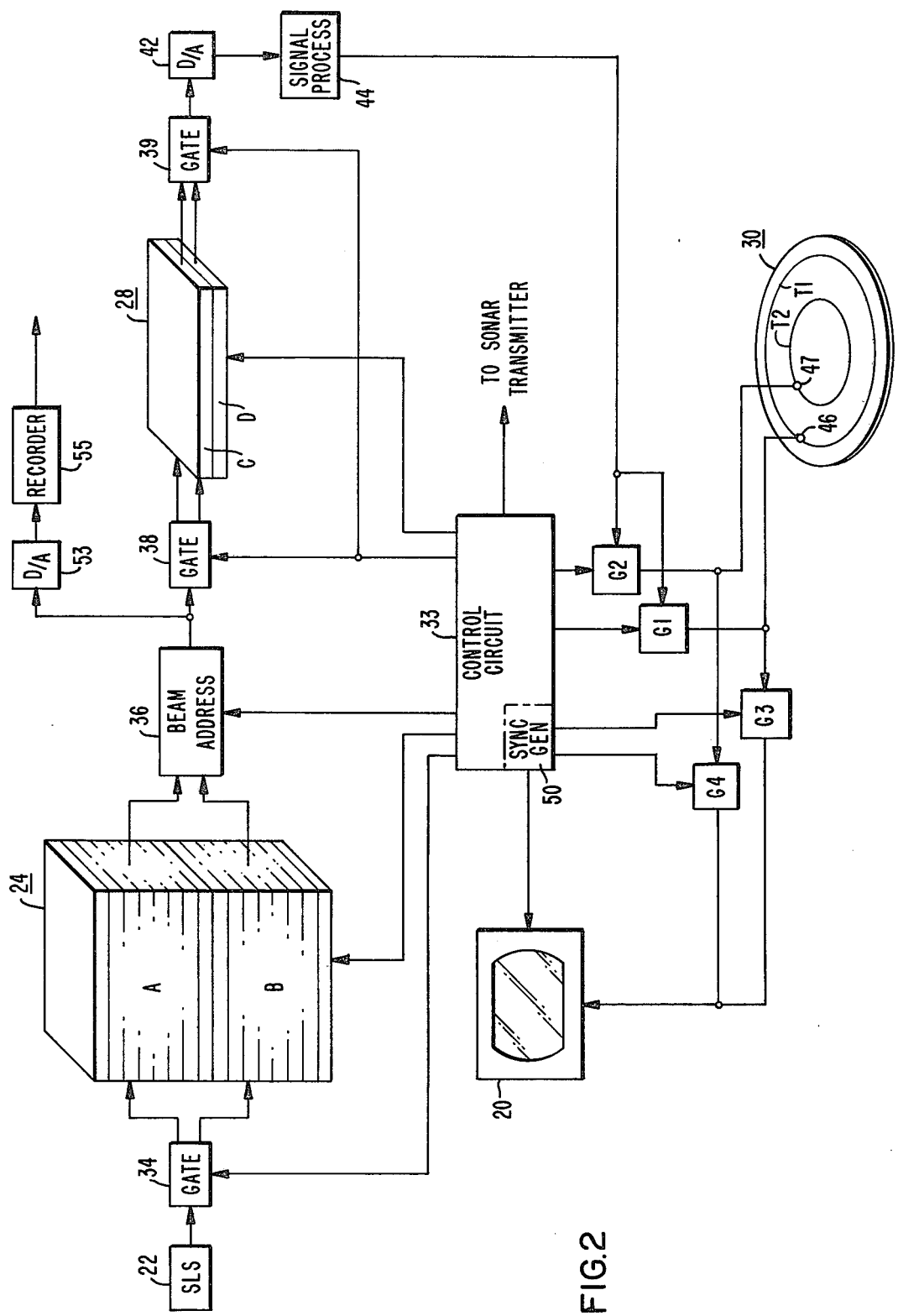
FIG. 2 is a block diagram of one embodiment of the present invention.

FIG. 2 illustrates an embodiment of the present invention wherein the multiple receiver beams, received at a relatively slow rate, are scan converted and provided as a moving window display. For simplicity, operation will be described with respect to, for example, the starboard set of beams; however, the principles of operation are equally applicable to the port set of beams.

Basically, the requirement is to portray on TV monitor 20, the multiple beam signals provided by sidelooking sonar system 22 and to display these signals as a moving window display. To accomplish this, the present invention provides two stages of scan conversion, one being a relatively slow scan operation and the other a relatively fast scan conversion operation compatible with TV rates.

The first scan converter section includes a first storage device 24 including two storage sections A and B, each section being of a size to accommodate all of the beam signals of one acoustic transmission. The storage device may take the form of any well known type of storage and will be described by way of example with respect to shift register devices. Let it be assumed that the sidelooking sonar system 22 provides a maximum of eight receiver beam signals for each acoustic transmission. If each beam signal is digitally quantized into 1,024 digital words, each being four bits, then each register A or B will be 1,024 × 4 × 8 bits.

The beam signals from one transmission are placed into one section of first storage device 24, while the beam signals from a previous transmission are read out of the other section and provided to a second converter section, which operates at much higher speeds and which includes second storage device 28 which includes first and second sections C and D. With the second storage device also being of shift register design, each section C or D is of a size to accommodate only one beam signal and accordingly, each section would be 1,024 × 4 × 1 bit.

The beam signals are alternately read out of sections C and D at a relatively high TV rate and are presented to a rotating storage medium in the form of video disc 30 which, for a conventional 525 line, 30 frames per second, 2 fields per frame interlaced Tv system, includes first and second recording tracks T1 and T2 and rotates at 3600 rpm, although the particular examples given herein may vary, depending upon the standards utilized.

Operation of the first and second scan converter sections, as well as other operations, is governed by a control circuit 33 which provides the necessary timing and control signals to the various circuits. In addition to supplying the necessary and prope clock pulses to storage register sections A, B, C and D, it also provides the necessary control signals for detemining into which register the beam signals will be placed, and from which registers they will be extracted. For example, a control signal to gate 34 will determine into which section, A or B, the multiple beam signals will be placed. The results of the previous transmission will then be read out of the other sections of the storage device, as selected by the beam address circuit 36.

The gating into and out of sections C and D are respectively governed by gates 38 and 39, with the clock pulses being provided to the appropriate section of storage device 28 and control signals being provided to gates G1 and G2 so that the beam signals will be written onto the appropriate tracks of the disc 30 at the proper time. Prior to being written on the disc, however, the signals from sections C and D are first converted to analog form by digital to analog converter 42 and processed in signal processing circuit 44 in a normal manner.

The rotating video disc 30, in conjunction with read-write heads 46 and 47, is used to compile the individual lines of data from the scan converter section into an interlaced television format compatible with a conventional 525 line interlaced 30 frames per second CRT monitor 20 and to present that data as a continuously moving display with new data appearing at the top of the screen, moving down the screen at a rate indicative of the sonar vehicle velocity, and finally disappearing off the bottom of the display. The proper operating signals for this type of display are provided by the control circuit, including the sync generator 50 which, in addition to governing the monitor 20, may also supply the proper gating signals to gates G3 and G4, whereby information is read from the disc 30.

Video disc technology is commonplace and well known to those skilled in the art; accordingly, various erase circuits, amplifiers, and constant speed drive circuits for maintaining a constant 3600 rpm have not been illustrated.

Thus, with the provision of the double scan conversion operation, the storage required for the relatively high speed scan conversion step is greatly reduced, thus reducing costs, power usage and heat dissipation. Another advantage provided by the arrangement is the ability to record the sonar data by means of relatively inexpensive online tape recorders. For this purpose, there is provided, after the first scan conversion section, a digital to analog converter 53, which provides, on a line-by-line basis, the analog beam signals to online recorder 55.

Figure 3:
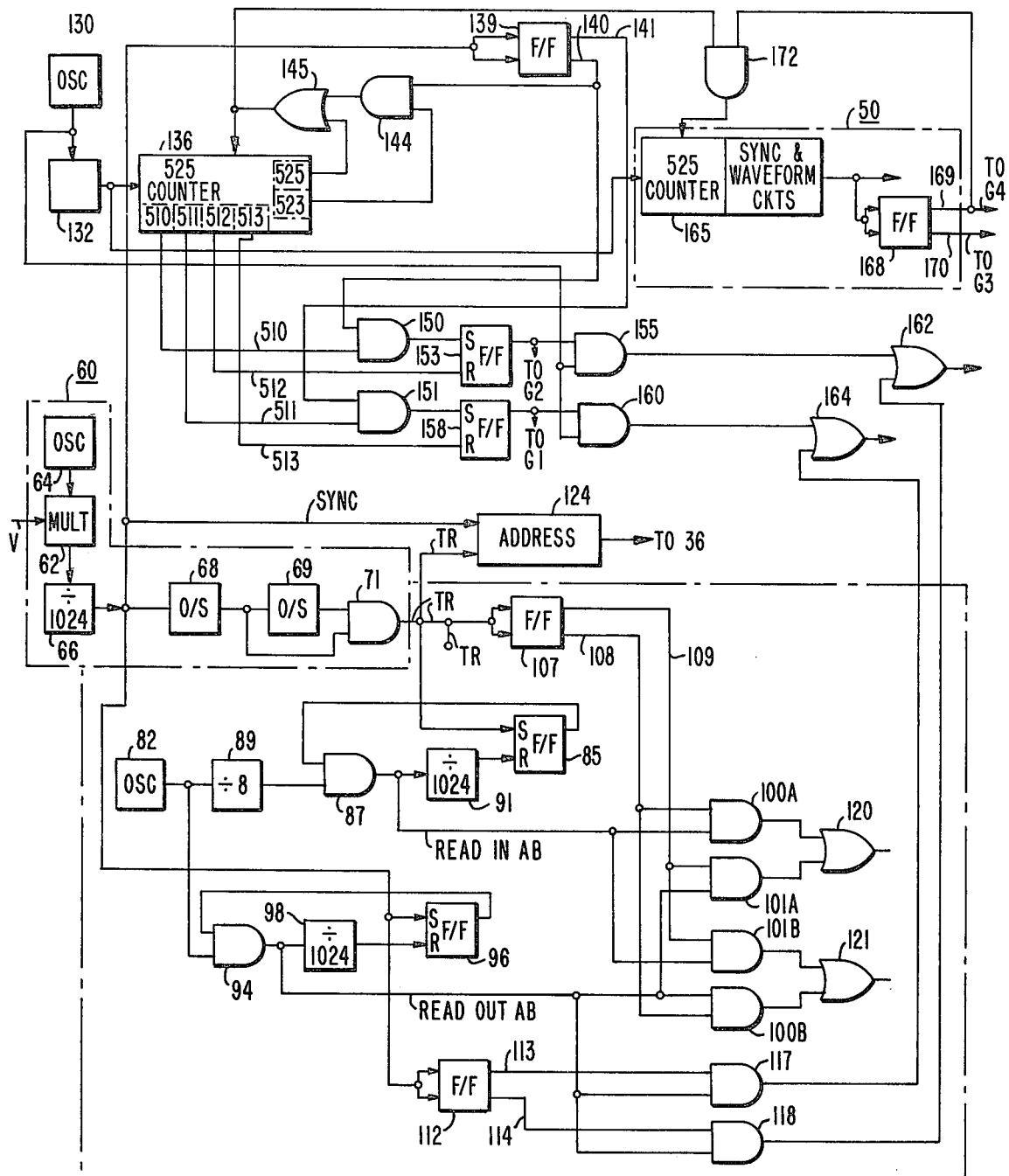
FIG. 3 is a block diagram illustrating the control circuit of FIG. 2 in more detail.

Referring now to FIG. 3, there is illustrated by way of example a typical control circuit which may be utilized to accomplish the double scan conversion and subsequent display. Although the sidelooking sonar apparatus may be designed for a fixed number of beams, and for travel at a certain predetermined velocity over the target area, a more versatile system results if provision is made for varying the pulse repetition frequency and for dropping one or more beams, as velocity requirements change. There are various ways of determining the proper number of beams to be used for a certain carrier velocity, as well as the sonar pulse repetition frequency that is required. Thus, in FIG. 3, circuit 60 includes a multiplier 62 which receives a constant frequency signal from oscillator 64 and receives an input signal V indicative of vehicle velocity to provide an output signal whose frequency is proportional to the vehicle velocity, and which frequency is divided by a counter chain 66 yielding, what is termed herein, a sync signal at a predetermined rate of so many pulses per second per knot, e.g., 3.3 pulses per second per knot.

The sync signal is provided to one shot multivibrator 68, the output of which is supplied to one shot multivibrator 69 and to AND gate 71. Multivibrator 68 is of the type which will provide a relatively narrow output pulse for each sync pulse received, whereas multivibrator 69 is of the type which, when provided with a certain input pulse, will be set for a minimum time duration and will be unaffected by subsequent input pulses until the termination of that time duration. Therefore, by taking the inverted output of multivibrator 69 and combining it with the output of multivibrator 68 (in effect the sync pulses), the arrangement will set the minimum transmit interval by enabling the first sync pulse occurring after the period of multivibrator 69 to enable AND gate 71 to provide an output transmit signal TR.

Figure 4:
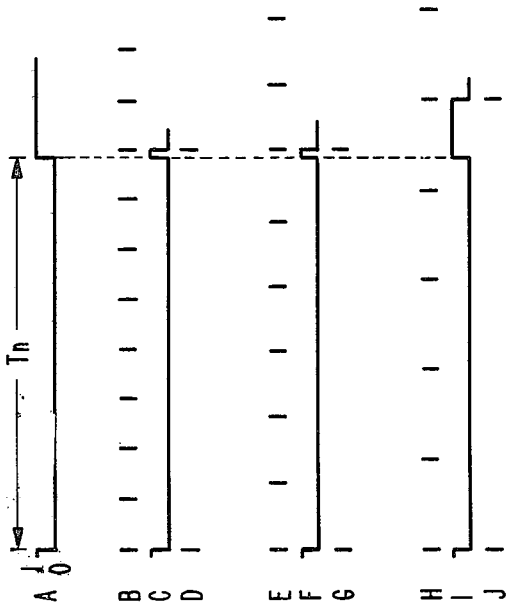
FIG. 4 is a timing diagram illustrating the operation of certain portions of FIG. 3.

This operation may be demonstrated with reference to the waveforms of FIG. 4. Waveform A represents the output of multivibrator 69 and has a period $T_n$ which is equal to the nominal sonar transmit interval. Waveform A is the input to AND gate 71, and it is seen that the signal remains at a logic zero value for a period $T_n$, after which it will revert to a logic one value until the next input signal is received from multivibrator 68.

Waveforms B, C and D represent the situation for maximum velocity. Assuming that at maximum velocity, the sidelooking sonar system utilizes eight beams, oscillator 64, multiplier 62 and divider 66 are designed such that eight sync pulses, waveform B, will be provided, with the eighth pulse occurring just after $T_n$ of the multivibrator output C to cause AND gate 71 to provide a transmit signal, waveform D.

Waveforms E, F and G illustrate the situation wherein the velocity has slowed to a point such that the sixth sync pulse will occur after the period $T_n$ to initiate a transmit pulse. Waveform F represents the output of multivibrator 69 and waveform G represents the transmit pulses for the slower condition, utilizing six beams (although the sonar PRF is almost equal to the 8 beam case). It may be analytically shown that there are velocities below $V_{max}$ where the number of beams is less than the maximum but the time interval between transmit pulses may be the same as the 8 beam case.

When the carrier velocity has slowed to a point where only five beams are to be utilized, the fifth sync pulse, waveform H, after the period $T_n$ of waveform I, will initiate the transmit pulses, waveform J.

Referring once again to FIG. 3, the operation of the first scan converter section is such that the beam signals from one transmission will be loaded into one section of the first storage device, while beam signals from a previous transmission are read out from the other section and provided to the second storage device.

Read-write circuit 80 is provided to accomplish this function and includes a source of clock pulses in the form of oscillator 82, from which is derived read-in clock pulses for one section of the first storage device in response to each transmission, and read-out clock pulses for the other section in response to each beam or sync signal from driver 66.

For an example of eight beams, let it be assumed that all eight beam signals are loaded in in parallel. Since the beam signals from the other section are gated out in a serial manner, the clock pulses to the register for reading out are supplied at a rate eight times as fast as those supplied to the register reading in. Accordingly, for reading in, there is provided a flip-flop 85 which receives the transmit signal to be placed in a set condition thus enabling AND gate 87. The output of oscillator 82 is divided by 8 in divider circuit 89 and, for the present example, AND gate 87 will pass 1,024 pulses for reading in. After 1,024 pulses have been counted by counter 91, It will provide a reset signal to flip-flop 85, thus removing the enabling signal from AND gate 87 until the next transmit when the next beam signals are to be loaded into the other section.

The read out signals are taken directly from oscillator 82 and provided to AND gate 94 which receives an enabling signal from flip-flop 96 upon the occurrence of a sync pulse. 1,024 pulses are then provided by AND gate 94 at a frequency eight times as fast as te pulse provided by AND gate 87, and after 1,024 pulses counter 98 will provide a signal to reset flip-flop 96, which will thereafter be set upon the occurence of the next sync pulse.

The read in and read out pulses from AND gates 87 and 94 are provided to a series of AND gates 100A and 100B and 101A and 101B. Flip-flop 107 is of the type which will alternately switch states upon the occurrence of sequential input pulses, such that in response to one transmit pulse, output line 108 will provide an enabling signal and in response to the next transmit pulse, output line 109 will provide an enabling signal, to the series of AND gates 100A, 100B, 101A and 101B.

Let it be assumed that in response to a transmit pulse flip-flop 107 provides an enabling signal on output line 108, thus enabling AND gates 100A and 100B. Accordingly, read in pulses from AND gate 87 will be passed by AND gate 100A for reading in the beam signals to section A of storage device 24 while simultaneously read out pulses from AND gate 94 are passed by AND gate 100B to read out the B section of storage device 24.

The read out signals from section B are to be alternately placed into the C and D sections of storage device 28 with the read in pulses therefor being at the same frequency as the read out pulses of section B. For this purpose, flip-flop 112 is responsive to a sync signal for alternately providing enabling signals on output lines 113, 114 to AND gates 117 and 118, which additionally receive the read out pulses from AND gate 94 to be passed on to the appropriate D or C section.

Upon the occurrence of the next transmit signal, the beam signals that were stored in section A are to be read out and alternately placed into sections C and D. With this next transmission, flip-flop 107 will switch states to provide an enabling signal on line 109 to AND gates 101A and 101B which respectively then receive the read out pulses from AND gate 94 and read in pulses from AND gate 87. OR gates 120 and 121 ae provided to gate the appropriate pulses, either read in or read out, to respective sections A and B.

Since the system is operative with multibeam apparatus which may vary the number of beams, there is provided an address circuit 124 which is responsive to the number of sync signals occurring between transmissions, the same number of sync signals being indicative of the number of beams, to in turn provide an output signal which is fed to the beam address circuit 36 for addressing the beam locations to be sequentially read out.

For the read in operation, gate 34 (FIG. 2) may be toggled by, for example, the transmit pulse.

The second scan converter section is a high speed operation for further time compressing the output of the first scan converter section from a relatively slow signal compatible with the recorder 55 (FIG. 2) to a signal compatible with a TV line time. The beam signals read out of section A or B are alternately placed into sections C and D and when the disc is in the proper position, the data will be read out at a high data rate and placed in the appropriate track of the disc.

The circuitry to accomplish this includes a high frequency oscillator 130, the output of which is counted down by divider 132 to yield a signal having the same frequency as the half line counter frequency in a conventional TV system. In other words, for a 525 line system, the pulses provided by divider 132 have a frequency of 31.5 kilohertz so that every two pulses is equivalent to one TV line time.

Each beam signal will be presented on the TV monitor as a separate TV line. The beam signals are alternately written onto the odd and even tracks of the disc 30 with each line starting at a position one-half a Tv line ahead, in the direction of the disc rotation of the previously written line in the other track. In addition, after the writing of each two lines on the disc (one even and one odd), the position of reference for the top line of the TV monitor is also advanced by one full television line in the direction of disc rotation. The effect of this advance, or sync slipping, results in apparent motion of the stored picture from top to bottom of the Tv screen with the motion or pull-down rate of the display being related to the velocity of the apparatus over the target area.

To accomplish this, the control circuit includes a divide by 525 counter 136 which is operable to provide an output at the count of 510, 511, 512, 513, 523 and 525, and on alternate sync pluses counter 136 will be reset to zero, either at the count of 523 (one TV line advance) or at the normal count of 525.

In order to determine the resetting of the counter 136, there is provided flip-flop 139 which in response to the sync pulses will alternately provide output signals on lines 140 and 141. The output signal on line 140 is supplied to AND gate 144 which also receives the count of 523 signal from counter 136 such that an output signal will be provided by AND gate 144 and passed by OR gate 145 to reset counter 136 at the count of 523. When the other output line 141 of flip-flop 139 provides the output signal in response to the next sync pulse, AND gate 144 will not be enabled and, accordingly, the count 525 will be passed by OR gate 145 to reset counter 136.

Flip-flop 139 which alternates states on each sync pulse is utilized to alternately enable AND gates 150 and 151 to accomplish the writing in of the data stored in registers C and D alternately onto tracks T1 and T2 of disc 30, to write them in at the proper time, and to write them in at the proper location relative to one another, that is, displaced by one-half TV line. Thus, when line 141 of flip-flop 139 provides an output signal enabling AND gate 151, flip-flop 158 will be set when AND gate 151 is provided with the count of 511 from counter 136. The setting of flip-flop 158 enables AND gate 160 to pass high frequency clocking pulses from oscillator 130 to the C register for placement of the information stored therein onto one track of the disc. Two counts later, at the count of 513, flip-flop 158 receives a signal to reset it, thus terminating the clock pulses to the C register.

After the occurrence of the next sync pulse, flip-flop 139 provides an enabling signal on line 140 to AND gate 150 which will cause setting of flip-flop 153 when the count of 510 is received and will cause resetting of flip-flop 153 when the count of 512 is attained thus gating the high frequency pulses from oscillator 130 through AND gate 155 for one TV line time displaced one-half TV line ahead of the data previously written on the other track. The output of OR gate 162, connected to the C register, passes either the red in pulses from AND gate 118 or the read out pulses from AND gate 155. Similarly, the output of OR gate 164 is provided to the D register for passing red in signals from AND gate 117 or read out signals from AND gate 160.

The alternate control of gates 38 and 39 (FIG. 2) for reading into one section while reading out of the other section may be provided by the output of flip-flop 139, and the enabling signals for gates G1 and G2 (FIG. 2) may be provided by flip-flops 153 and 158.

As is well known, in various moving window displays the vertical sync of the TV monitor is advanced by a TV line. This may be accomplished by prematurely resetting the 525 counter normally associated with the synchronizing and waveform producing circuits generally provided. Accordingly, the sync circuit 50 may include the normal 525 counter 165 for the display and is responsive to the half line signal from divider 132 to provide its normal output signals. Each time the vertical display is advanced, flip-flop 168 will alternately provide an output signal on lines 169 and 170. These output signals may also be utilized as control signals for gates G3 and G4 (FIG. 2). Each time counter 136 is provided with a reset signal, a reset signal will be provided to 525 counter 165; however this counter will not be prematurely reset unless an even field is being read out, by way of example. That is if line 169 is the signal to gate G4 controlling the reading out of the even field on track T2, this signal is provided to AND gate 172 which also receives the reset signal from OR gate 145, and when both are present, will cause advancement of the display vertical sync to accomplish the moving window display, as is well known to those skilled in the art. The arrangement provides that the display is always slipped after an even field is read out.

It is to be noted that the system provided is asynchronous in nature in that the reading in and reading out of first storage device 24 is not locked to the disc operation or the reading of information from the C and D sections onto the disc. With this arrangement, a varying sonar pulse repetition frequency may be provided for beam dropping. In addition, the asynchronous operation is very useful for on-line recording of the sonar information which would otherwise require extremely expensive tape recorders which must be accurately synched with the disc. If there is no requirement for on-line recording and no requirement for a variable sonar PRF, then the system may be made synchronous and locked to the disc rotation.

Figure 5:
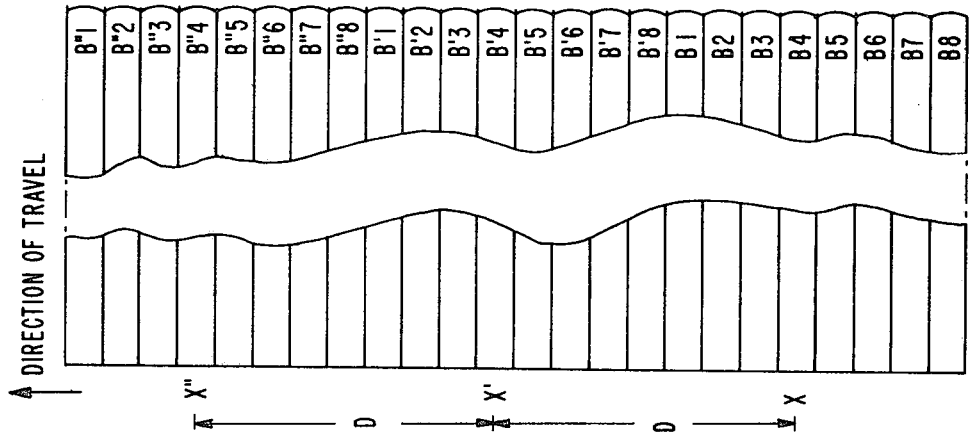

To further explain the operation of the apparatus, additional reference is made to FIG. 5 which illustrates by points X, X' and X" the position of the apparatus on three sequential acoustic transmissions. The distance between transmissions at a certain carrier velocity is D. For each transmission, eight receiver beams are formed, and designated B1 to B8 for the first transmissions, B'1 to B'8 for the second transmission and B"1 to B"8 for the third transmission. The beam signals from these transmissions alternately are placed into the two sections of the first storage device 24. Lwet it be assumed that signals B1 to B8 are placed into section A. On the next transmission from point X', beam signals B'1 to B'8 are placed into section B, in parallel, while the signals B1 to B8 are read out in a serial manner from section A, starting with the lastmost beam signal B8. After the next transmission at point X", beam signals B"1 through B"8 are placed into section A while the signals B'1 through B'8 are read out of section B, starting with beam signal B'8.

Figure 6:
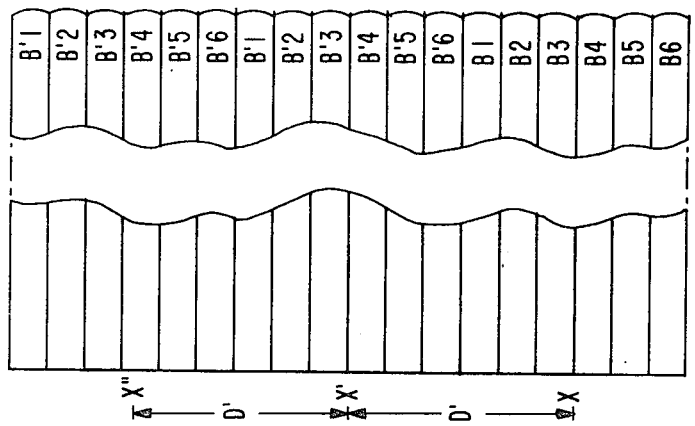
FIGS. 5 and 6 serve to illustrate the multiple acoustic transmissions in conjunction with the multiple receiver beams formed for an eight beam and six beam system, respectively.

If the vehicle velocity slows to a point where two beams are dropped, as in FIG. 6, transmissions will take place at points X, X' and X" and it is possible that the PRF will be the same or close to that of FIG. 5; however, the distance between transmission D' will be less than that of FIG. 5. The operation is the same as with respect to FIG. 5 with the beam signals being alternately placed into the first and second section of the first storage device 24 and read out therefrom starting with the last beam first.

Figure 7A:
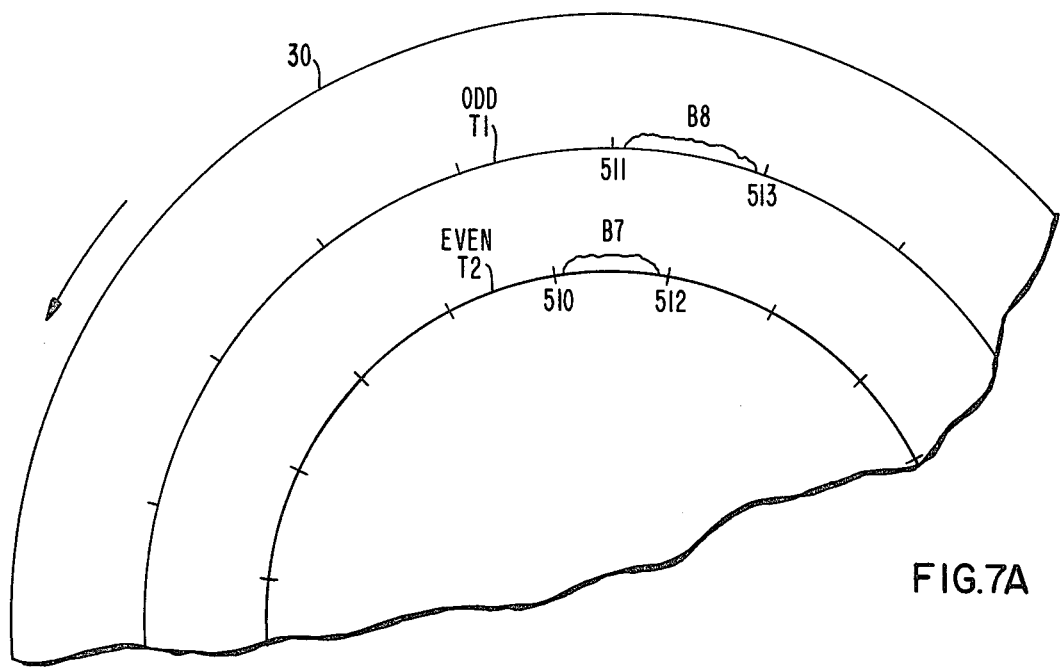
FIGS. 7A and 7B illustrate a portion of the video disc to demonstrate the writing of beam signals thereon; and, FIGS. 8A through 8H illustrate a moving window display for an eight beam system.
Figure 7B:
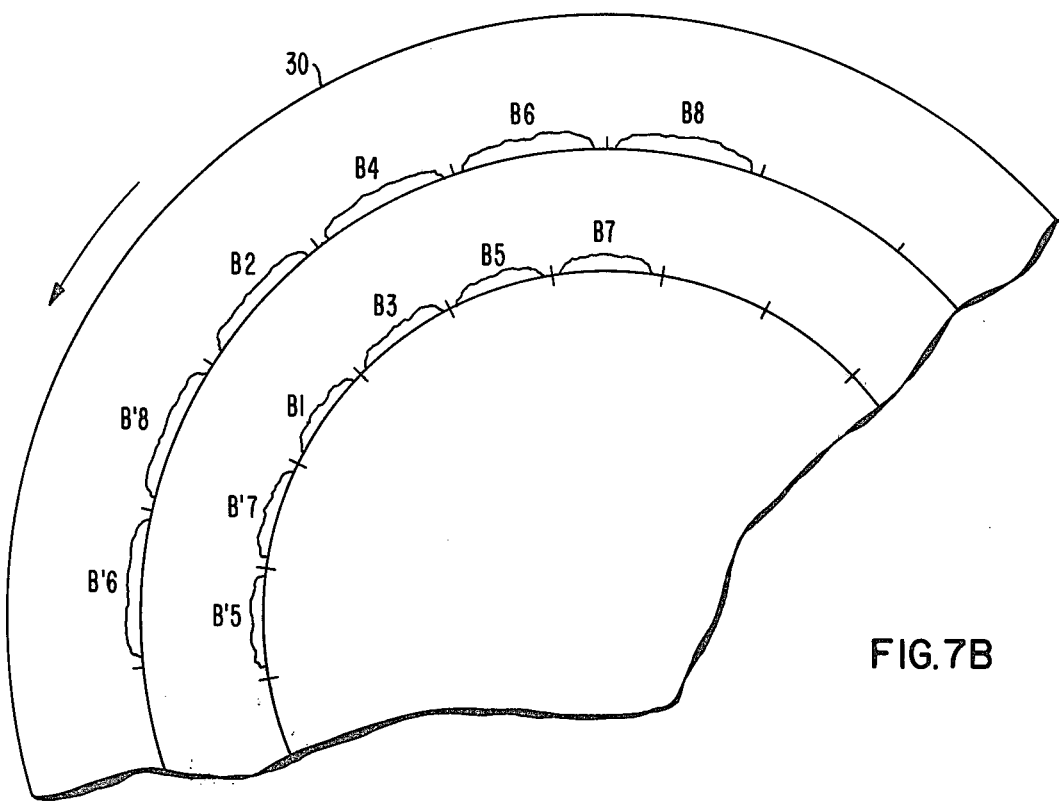

FIG. 7A illustrates a portion of the disc 30, rotating at 3600 rpm in the direction of the arrow, with tracks T1 and T2 divided into a number of slot locations, each to accommodate a differenct beam signal with each slot location being equivalent to two half-lines, or one TV line. With additional reference to FIG. 3, beam signal 8 is written into a slot location on th odd field track T1 during the count from 511 to 513 provided to AND gate 151 and flip-flop 158. Counter 136 will reset at the count of 525 and flip-flop 139 will enable AND gate 150 on the next sync pulse such that the next beam signal B7 is written onto track T2 during the period from count 510 to 512, displaced one-half TV line ahead of signal B8. The operation of the circuitry continues until all of the beam signals from one transmission are read out and placed onto the disc 30 in a manner as illustrated in FIG. 7B with the results of subsequent transmissions being placed ahead of those already written, in a similar manner.

To illustrate the moving window operation, reference is now made to FIGS. 8A through 8H which show the TV display, and above it, the tracks T1 and T2 (linearly arranged) of the disc 30. The first two beam signals B8 and B7 are written into their respective slot locations during the TV vertical blanking period and after the display sync has been slipped, they will appear on the screen with B7 of the even field appearing as a half-line and B8 of the odd field as the first full line. Signals B6 and B5 are written in during vertical blanking and when the display sync is again slipped, the first line, or half-line of the display will be signal B5 followed by the remaining beam signals B6 through B8.

FIG. 8C shows the display after the next two signals have been written and displayed and FIG. 8D illustrates all of the signals from one transmission. In FIG. 8E, the first two signals from the next transmission appear (as dotted lines) with the remaining figures progressively showing the writing and the displaying of the subsequent beam signals. The effect of this operation is to display the sonar data on the TV monitor as though one were traveling over the target area at a speed equal or closely related to the actual carrier speed, and viewing the target area through a window.

Accordingly, there has been provided apparatus for displaying the data of multibeam sidelooking sonar system on a conventional TV monitor and is compatible with such systems which utilize a variable PRF and beam dropping for different carrier velocities and which require a moving window display. The apparatus uses two scan converter sections, each including storage with the bulk of the storage taking place in the first section operating at a relatively low speed, thereby minimizing hardware costs, power usage, and heat dissipation.

We claim:

1. A display system for a multibeam sidelooking sonar system which operates in repetitive transmission cycles during travel over a target area and wherein a plurality of received beam signals is provided as a result of each said transmission, comprising:
   A. display means for displaying said signals;
   B. a rotating storage means;
   C. first and second storage means each including two storage sections;
   D. means for placing said received signals into one of said sections of said first storage means and reading out previously stored received signals, in a sequential manner, from the other said section;
   E. means for alternately placing said read out signals into said first and second sections of said second storage means;
   F. means for reading out said signals from said second storage means and placing said read out signals into locations of said rotating storage means;
   G. means for reading said signals from said rotating storage means and providing them to said display means; and
   H. means for relatively moving the displayed information on said display means, in accordance with movement over said target area.

2. Apparatus according to claim 1 wherein
   A. the reading in and reading out of said first storage means is synchronous with respect to the reading in of said second storage means and asynchronous with respect to the reading out of said second storage means.

3. Apparatus according to claim 2 which includes
   A. first and second oscillators for providing respective output signals asynchronous with respect to each other;
   B. said reading in and reading out of said first storage means being at a rate governed by said first oscillator; and
   C. said reading out of said second storage means being at a rate governed by said second oscillator.

4. Apparatus according to claim 1 which includes
   A. means coupled to a point between said first and second storage means for recording the signals read out from said first storage means.

5. Apparatus according to claim 1 which includes
   A. means for varying the pulse repetition frequency of said transmission cycles in accordance with said system velocity over said target area.

6. Apparatus according to claim 5 wherein
   A. each said section of said first storage means has the capacity for storing a maximum number of beam signals for maximum velocity and which includes
   B. means for reading out less than said maximum number of beam signals when said velocity falls below a certain value.

7. Apparatus according to claim 1 wherein
   A. each said section of said first storage means has the capacity for storing a predetermined number of beam signals; and
   B. each said section of said second storage means has the capacity for storing only one beam signal.

8. Apparatus according to claim 1 wherein
   A. said display means is a TV monitor operable in a 2 fields per frame interlaced mode;
   B. said rotating storage medium is a video disc rotatable at a constant speed, and including first and second recording tracks, one for each said field and wherein
   C. the information in one said section of said second storage means is placed into a location on said first track and the information in the other said section is placed into a location on said second track at a position displaced the equivalent of one-half TV line ahead, in the direction of disc rotation, of said information on said first track.

9. Apparatus according to claim 8 wherein
   A. the vertical sync of said TV monitor is advanced after said first and second tracks have received the information from said second storage means.

* * * * *